(12) United States Patent
D'Andrea et al.

(10) Patent No.: US 10,296,446 B2
(45) Date of Patent: May 21, 2019

(54) PROACTIVE AND SELECTIVE REGRESSION TESTING BASED ON HISTORIC TEST RESULTS

(71) Applicant: International Business Machines Corporation, Armonk, NY (US)

(72) Inventors: Adam K. D'Andrea, Stouffville (CA); Jenna R. Elliott, Newmarket (CA); Fahad A. Khan, Milton (CA); Raymond C. Kwong, Newmarket (CA); Chad J. McIntyre, Richmond Hill (CA); Sina Sadeghian Sadeghabad, Kitchener (CA)

(73) Assignee: International Business Machines Corporation, Armonk, NV (US)

( * ) Notice: Subject to any disclaimer, the term of this patent is extended or adjusted under 35 U.S.C. 154(b) by 0 days.

(21) Appl. No.: 14/944,271

(22) Filed: Nov. 18, 2015

(65) Prior Publication Data

US 2017/0139819 A1 May 18, 2017

(51) Int. Cl.
*G06F 9/44* (2018.01)
*G06F 11/36* (2006.01)

(52) U.S. Cl.
CPC ........ *G06F 11/3688* (2013.01); *G06F 11/368* (2013.01); *G06F 11/3672* (2013.01); *G06F 11/3692* (2013.01)

(58) Field of Classification Search
CPC ... G06F 11/36; G06F 8/70; G06F 8/71; G06F 8/444

(Continued)

(56) References Cited

U.S. PATENT DOCUMENTS 7,178,063 B1 2/2007 Smith
7,873,944 B2 1/2011 Bangel et al.
(Continued)

FOREIGN PATENT DOCUMENTS

CN 101908020 B 5/2012
CN 101866317 B 7/2012

OTHER PUBLICATIONS

"A system to suggest regression test cases based on indirect change set and component references", An IP.com Prior Art Database Technical Disclosure, Authors et. al.: Disclosed Anonymously, IP.com No. 000227936, IP.com Electronic Publication: May 29, 2013, pp. 1-5.
(Continued)

*Primary Examiner* — Duy Khuong T Nguyen
(74) *Attorney, Agent, or Firm* — Christopher K. McLane; Maeve L. McCarthy

(57) ABSTRACT

In an approach to reducing regression test duration, one or more computer processors receive a first code change. The one or more computer processors retrieve one or more historic code changes relevant to the first code change. The one or more computer processors determine whether one or more failed test cases are relevant to the one or more historic code changes, where the one or more relevant failed test cases and the one or more historic code changes are stored in a table of test history. In response to determining the one or more historic code changes are relevant to one or more failed test cases, the one or more computer processors retrieve the one or more relevant failed test cases from the table of test history.

14 Claims, 7 Drawing Sheets

(58) Field of Classification Search
USPC .......................................................... 717/124
See application file for complete search history.

(56) References Cited

U.S. PATENT DOCUMENTS

| | | | | |
|---|---|---|---|---|
| 8,117,598 | B2* | 2/2012 | Johnson | G06F 11/3688 717/124 |
| 8,276,123 | B1 | 9/2012 | Deng et al. | |
| 9,442,830 | B1* | 9/2016 | Zhang | G06F 11/3688 |
| 2005/0223357 | A1* | 10/2005 | Banerjee | G06F 11/3676 717/120 |
| 2007/0006041 | A1* | 1/2007 | Brunswig | G06F 11/3688 714/38.14 |
| 2008/0209276 | A1* | 8/2008 | Stubbs | G06F 11/3688 714/38.14 |
| 2009/0070734 | A1* | 3/2009 | Dixon | G06F 8/71 717/102 |
| 2010/0100871 | A1* | 4/2010 | Celeskey | G06F 11/008 717/124 |
| 2011/0016452 | A1* | 1/2011 | Gorthi | G06F 11/3688 717/124 |
| 2011/0145793 | A1* | 6/2011 | Alexander | G06F 11/368 717/124 |
| 2011/0296383 | A1 | 12/2011 | Pasternak | |
| 2012/0042302 | A1* | 2/2012 | Sikandar | G06F 11/3688 717/125 |
| 2012/0304157 | A1 | 11/2012 | Kawashima et al. | |
| 2013/0091490 | A1* | 4/2013 | Mizrahi | G06F 11/3676 717/122 |
| 2014/0013307 | A1* | 1/2014 | Hansson | G06F 11/3692 717/124 |
| 2014/0282411 | A1 | 9/2014 | Liemandt et al. | |
| 2014/0325480 | A1 | 10/2014 | Bhagavatula | |
| 2014/0351793 | A1 | 11/2014 | Bartley et al. | |
| 2016/0162385 | A1* | 6/2016 | Allen | G06F 11/368 714/38.1 |
| 2017/0091078 | A1* | 3/2017 | Atyam | G06F 11/3616 |
| 2017/0139819 | A1 | 5/2017 | D'Andrea et al. | |

OTHER PUBLICATIONS

"Which tests should be run since a previous build?", Visual Studio 2015, Printed on Nov. 16, 2015 4:40 PM, © 2015 Microsoft, 3 pages, <https://msdn.microsoft.com/en-us/library/dd286589.aspx>.
U.S. Appl. No. 15/052,931, Entitled "Proactive and Selective Regression Testing Based om Historic Test Results", filed Feb. 25, 2016.
Appendix P.: List of IBM Patents or Patent Applications Treated as Related, Dated Feb. 25, 2016, 2 pages.

* cited by examiner

| Changes In Weekly Build 20140610 | |
|---|---|
| User 1 | Change #1234567; foo.c;lines 21,43-47;100-101 |
| User 2 | Change #1234568; bar.c;line 11 |
| User 3 | Change #1234569; foobar.c;lines 12-34;55-58 |
| User 2 | Change #1234570; bar.c;lines 25-30,110-120,300 |
| User 4 | Change #1234571; bar.c;lines 27-30,50 |
| User 3 | Change #1234572; foo.c;line 7 |
| User 4 | Change #1234573; bar.c;lines 50-53,98 |
| User 1 | Change #1234574; foobar.c;line 22 |
| User 1 | Change #1234575; foo.c;lines 31,59-63 |
| User 2 | Change #1234576; foo.c;lines 237-240, 301-305 |

| Test History Table Results for rarely_fails.test | |
|---|---|
| User 4 | Change #456; bar.c;lines 27-29 |
| User 4 | Change #1238; bar.c;line 3 |
| User 3 | Change #123; foobar.c;lines 12-34;55-58 |
| User 3 | Change #897; bar.c;lines 29,110-112 |
| User 2 | Change #14571; bar.c;lines 11-30,90 |
| User 1 | Change #572; foo.c;lines 75-80 |
| User 1 | Change #173; bar.c;lines 27-30 |
| User 4 | Change #12344; bar.c;line 11 |
| User 1 | Change #2415; foo.c;lines 59-63 |
| User 2 | Change #176; barfoo.c;lines 43,65,76 |

FIG. 5A

| Changes In Weekly Build 20140610 | |
|---|---|
| User 1 | Change #1234567; foo.c;lines 21,43-47;100-101 |
| User 2 | Change #1234568; bar.c;line 11 |
| User 3 | Change #1234569; foobar.c;lines 12-34;55-58 |
| User 2 | Change #1234570; bar.c;lines 25-30,110-120,300 |
| User 4 | Change #1234571; bar.c;lines 27-30,50 |
| User 3 | Change #1234572; foo.c;line 7 |
| User 4 | Change #1234573; bar.c;lines 50-53,98 |
| User 1 | Change #1234574; foobar.c;line 22 |
| User 1 | Change #1234575; foo.c;lines 31,59-63 |
| User 2 | Change #1234576; foo.c;lines 237-240, 301-305 |

| Test History Table Results for rarely_fails.test | |
|---|---|
| User 4 | Change #456; bar.c;lines 27-29 |
| User 4 | Change #1238; bar.c;line 3 |
| User 3 | Change #123; foobar.c;lines 12-34;55-58 |
| User 3 | Change #897; bar.c;lines 29,110-112 |
| User 2 | Change #14571; bar.c;lines 11-30,90 |
| User 1 | Change #572; foo.c;lines 75-80 |
| User 1 | Change #173; bar.c;lines 27-30 |
| User 4 | Change #12344; bar.c;line 11 |
| User 1 | Change #2415; foo.c;lines 59-63 |
| User 2 | Change #176; barfoo.c;lines 43,65,76 |

FIG. 5B

PROACTIVE AND SELECTIVE REGRESSION TESTING BASED ON HISTORIC TEST RESULTS

BACKGROUND OF THE INVENTION

The present invention relates generally to the field of regression testing, and more particularly to proactive and selective regression testing based on historic test results.

Regression testing is a manual development process in which a code developer creates test cases upon completion of a code change and executes the test function to determine if the new code functions properly and does not give rise to unwanted side effects arising from interaction between added features and existing code. Generally, in a development and verification environment, a large set of regression test cases and/or benchmarks is generated and retained for analysis of design revisions and extensions. In the verification environment in which a large set of regression test cases exists, the testing of a new version of the design may require a significant amount of time in order to perform each and every one of the regression test cases. Often, reasonable balance is sought to avoid testing every possible available regression test case, while still achieving reasonable confidence in software quality.

Large software products, such as compilers, have complex and sensitive code, where a change in one component can uncover bad functionality that has gone undetected in another component. Some software products also have large, resource-intensive bodies of tests, leading to functional testing that can comprise tens of thousands of test cases and take several days to execute. In addition, a single performance benchmark can take over a day to compile. Thus testing may only be performed on a weekly basis instead of after each code change.

SUMMARY

Embodiments of the present invention disclose a method, a computer program product, and a system for reducing regression test duration. The method may include one or more computer processors receiving a first code change. The one or more computer processors retrieve one or more historic code changes relevant to the first code change. The one or more computer processors determine whether one or more failed test cases are relevant to the one or more historic code changes, where the one or more relevant failed test cases and the one or more historic code changes are stored in a table of test history. In response to determining the one or more historic code changes are relevant to one or more failed test cases, the one or more computer processors retrieve the one or more relevant failed test cases from the table of test history.

BRIEF DESCRIPTION OF THE DRAWINGS

FIGS. 5A and 5B illustrate an example of the operation of the test history program selecting relevant code changes on the server computer within the distributed data processing environment of FIG. 1, in accordance with an embodiment of the present invention.

DETAILED DESCRIPTION

Very sophisticated or long-lived software may accumulate a large number of regression test cases. Problems may arise when the body of test cases exceeds the time and machine capacity allotted for testing. This may force a software development team to run tests on weekly or nightly builds rather than testing every code change as it is introduced. Testing software less often can lead to costly investigations into determining the code change responsible for a test failure. In situations such as this, selecting appropriate tests directly applicable to a code change, and running smaller subsets on the per-change level, can reduce the number of investigations required as a result of comprehensive per-build testing. Embodiments of the present invention recognize that efficiency may be gained by selecting appropriate regression test cases to run based on relevant, historic test failures of associated code changes, enabling a run on a per-change basis of a subset of tests specific to the change being introduced. Embodiments of the present invention also recognize that efficiency may be gained by determining which historic code changes caused a failure in a currently failing test case. In addition, embodiments of the present invention also recognize that providing a table of historic code changes and associated test failures and fixes can simplify the task of selecting and querying regression test cases. Implementation of embodiments of the invention may take a variety of forms, and exemplary implementation details are discussed subsequently with reference to the Figures.

Figure 1:
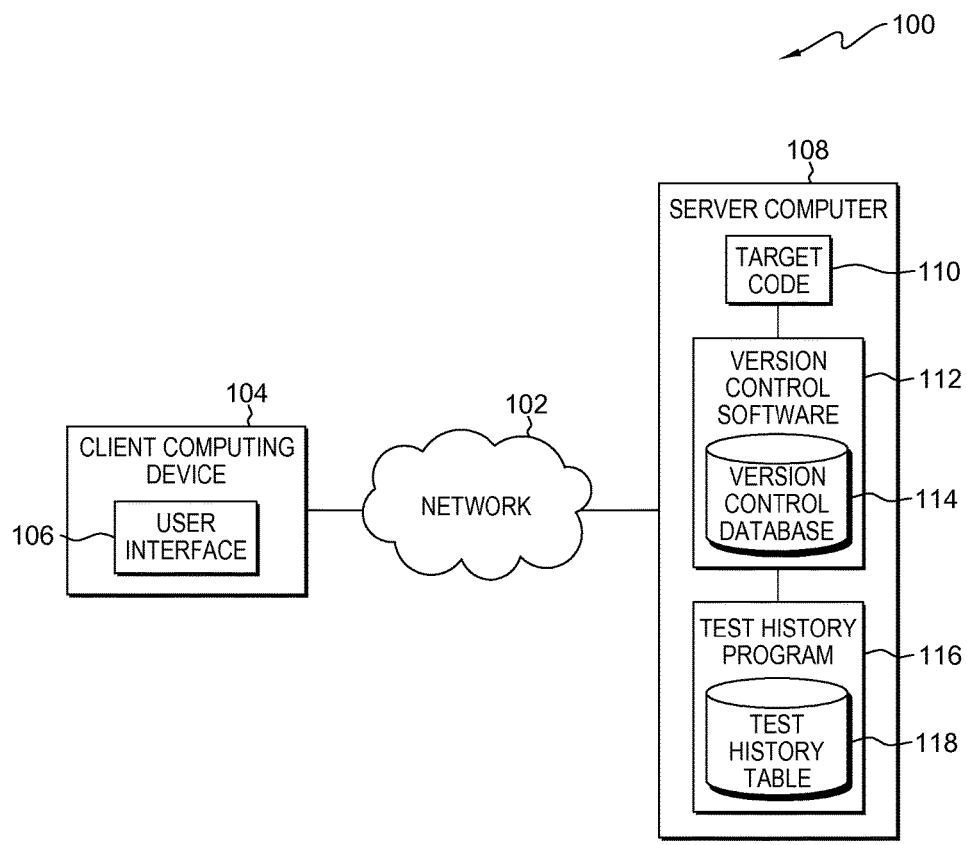
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In general, client computing device 104 represents any programmable electronic device or combination of programmable electronic devices capable of executing machine readable program instructions and communicating with other computing devices (not shown) within distributed data processing environment 100 via a network, such as network 102. Client computing device 104 includes user interface 106.

User interface 106 provides an interface between a user of client computing device 104 and server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to access server computer 108 for software development and testing activities.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes target code 110, version control software 112, and test history program 116. Server computer 108 may include internal and external hardware components, as depicted and described in further detail with respect to FIG. 6.

Target code 110 is an example of source code or machine code which a user of client computing device 104 is changing. Source code is any collection of computer instructions written using some human-readable computer language. The source code of a program is specially designed to facilitate the work of computer programmers, who specify the actions to be performed by a computer mostly by writing source code. The source code is often transformed by a compiler program into low-level machine code understood by the computer.

Version control software 112 is one of a plurality of software programs designed to manage changes or revisions to documents, computer programs, large web sites, and other collections of information. As a component of a software configuration management package, version control software 112 generally identifies changes by a number or letter code, termed the "revision number," "revision level," or simply "revision." In computer software engineering, version control, or revision control, is any kind of practice that tracks and provides control over changes to source code. Software developers may use version control software to maintain documentation and configuration files as well as source code. Version control software 112 includes version control database 114.

Version control database 114 is a repository for code changes managed by version control software 112. A database is an organized collection of data. Version control database 114 can be implemented with any type of storage device capable of storing data and configuration files that can be accessed and utilized by server computer 108, such as a database server, a hard disk drive, or a flash memory. Version control database 114 may store attributes associated with a code change such as the name of the developer that made the change, the date the change was made, the purpose of the change, and any detected defects associated with the change.

In the depicted embodiment, test history program 116 is a standalone program. As a standalone program, test history program 116 can reside on server computer 108 or elsewhere in distributed data processing environment 100, provided that test history program 116 has access to version control database 114. In another embodiment, test history program 116 is integrated into version control software 112. Test history program 116 may be used for both proactive regression testing and for selective regression testing. In proactive regression testing, test history program 116 compares a new code change to historic code changes associated with the new code change by overlapping code and determines whether any of the previous code changes are relevant to the new code change. Test history program 116 retrieves relevant test cases that have failed in response to the associated historic changes and notifies the user with a list of relevant test cases to run on the new code change. In selective regression testing, test history program 116 receives failing test results for one or more test cases and determines which historic code changes have caused the same test cases to fail in the past. Test history program 116 compares the historic code changes to new code changes and determines a subset of historic changes that are relevant to the new code changes. The user can selectively test the relevant new code changes, which may significantly reduce test time. Test history program 116 includes test history table 118. Test history program 116 receives test failure data, either from a user or from version control software 112, associates the test failure data with associated code changes and stores the data in test history table 118. Test history program 116 is depicted and described in further detail with respect to FIG. 2 through FIG. 5B.

Test history table 118 can be implemented with any type of storage device capable of storing data and configuration files that can be accessed and utilized by server computer 108, such as a database server, a hard disk drive, or a flash memory. Test history table 118 stores a permanent, historic record of which code changes caused which test cases and benchmarks to fail, as determined by test history program 116. Test history table 118 explicitly links failed test cases to historic code changes as rows in the table. Test history table 118 may also store additional metadata, such as date of occurrence, associated defects, and a severity of the failure, as columns in the table.

Figure 2:
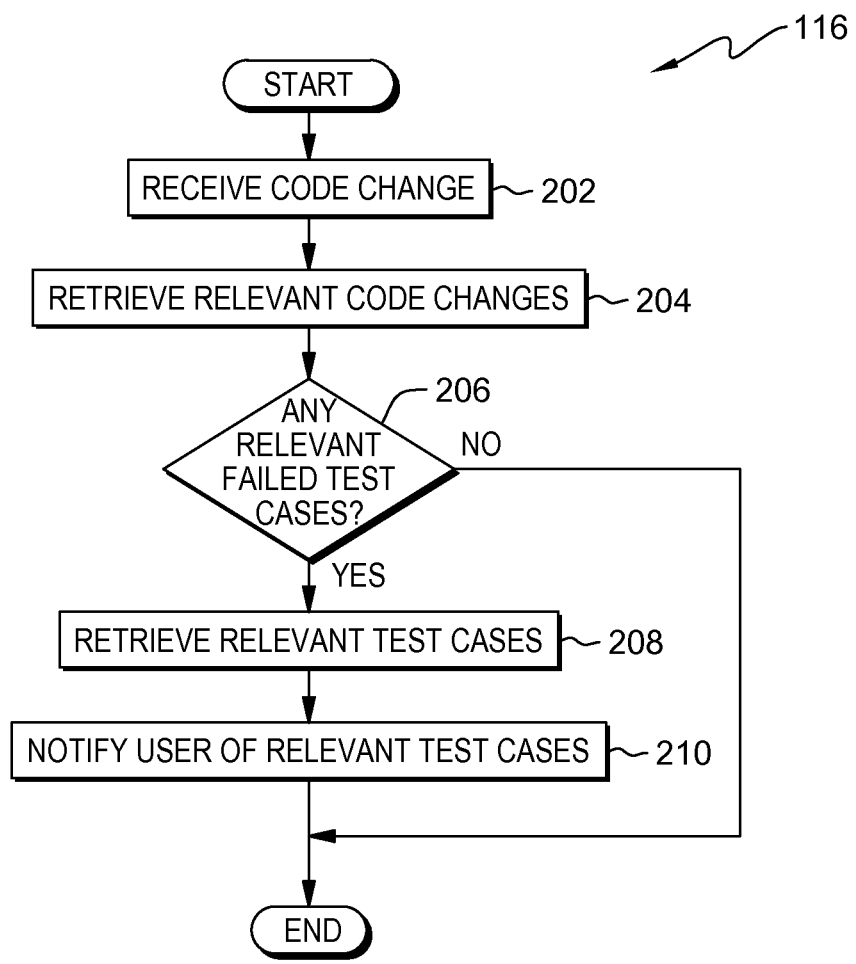
FIG. 2 is a flowchart depicting operational steps of a test history program, on a server computer within the distributed data processing environment of FIG. 1, for determining relevant test cases for proactive testing, in accordance with an embodiment of the present invention.

FIG. 2 is a flowchart depicting operational steps of test history program 116, on server computer 108 within distributed data processing environment 100 of FIG. 1, for determining relevant test cases for proactive testing, in accordance with an embodiment of the present invention.

Test history program 116 receives a code change (step 202). When a user, such as a software developer, changes a portion of code in target code 110, test history program 116 receives the code change. In one embodiment, the user may invoke test history program 116 upon making the code change via user interface 106. In another embodiment, test history program 116 may automatically detect the code change by comparing the new code to the previous version. In yet another embodiment, test history program 116 may receive the code change from version control software 112.

Test history program 116 retrieves relevant code changes (step 204). Test history program 116 queries version control database 114 and retrieves one or more records of any historic code changes that may be associated with, and therefore relevant to, the current code change. Relevance can be determined on a plurality of levels of granularity. For example, relevance can be determined at the file level, where test history program 116 queries version control database 114 for code changes in the same file. In another example, relevance can be determined at the line level, where test history program 116 queries version control database 114 for code changes in the same line or lines of code in a file. In a further example, for object oriented languages, relevance can be determined at the object level, where test history program 116 queries version control database 114 for code changes in the same function.

Test history program 116 determines whether there are any relevant failed test cases (decision block 206). Test history program 116 compares the associated, relevant code changes with code changes listed in test history table 118 to determine if any of the relevant code changes caused one or more test cases to fail in the past. For example, if a code change made in the past has one or more lines with positional overlap of lines of the new code change, test history program 116 determines if one or more test cases failed when the historic code change was tested.

If test history program 116 determines there are relevant test cases ("yes" branch, decision block 206), then test history program 116 retrieves the relevant test cases (step 208). If test history program 116 determines that one or more test cases failed when the historic code change was tested, then test history program 116 retrieves a list of the one or more relevant test cases from test history table 118. A test case failure's direct relationship with a historic code change can be implied to have a potential relationship to a new change by virtue of the defined relevance between the changes. Thus, the list of relevant test cases includes test cases that are likely to be affected by the new code change.

Test history program 116 notifies the user of relevant test cases (step 210). Test history program 116 provides the user with a list of one or more test cases that failed when relevant, historic code changes were made. In one embodiment, test history program 116 may notify the user with an auto-generated message on a pop up screen, via user interface 106. In another embodiment, test history program 116 may notify the user via email. In yet another embodiment, test history program 116 may provide the list to the user by storing the list in test history table 118. By providing a list of relevant test cases, test history program 116 enables the user to run a subset of test cases as a precautionary measure before submitting the new code change. In one embodiment, test history program 116 may rank the test cases in the list by relevance based on the level of granularity used in the relevance determination. For example, if relevance is at the line level, test history program 116 may rank a test case higher if the current code change overlaps a higher number of lines in one historic code change over another historic code change. In another example, test history program 116 may rank a more recent test case failure higher than an older test case failure.

In one embodiment, responsive to retrieving relevant test cases, test history program 116 automatically initiates testing the current code change with the relevant test cases on a build machine.

If test history program 116 determines there are no relevant test cases ("no" branch, decision block 206), then test history program 116 ends.

In an embodiment, a user can apply test history program 116 to a software component change where the scale of the code changes is large and may alter a program behavior significantly. Often, when a software product release is near completion, development enters a code freeze phase, and testing efforts may focus on the current code, whereas development efforts may move onto the next revision release. At this time, large scale changes can be introduced, either as a result of a large number of code changes due to long elapsed time, or due to component replacement. Once the current version is released, testing efforts may move to the next revision release and resume regular testing some time later. A user can apply test history program 116 to the large scale change by prompting test history program 116 to retrieve all test cases from test history table 118 that are associated with the software component that was changed. For example, a compiler may have a front-end processor (used for parsing high level languages into an internal representation) and a back-end processor (used for optimizing the internal representation and translating it into appropriate machine code). If a given release replaces or makes significant changes to the back-end, then a user can query test history program 116 for test cases that are associated with code changes in the back-end as a whole without regard to specific code changes that are in the current target code. In one embodiment, the user may query test history program 116 via user interface 106. In another embodiment, test history program 116 may determine the code being tested has changed significantly since the last testing was performed, via version control software 112, and subsequently notify the user, via user interface 106, with a list of relevant test cases, as discussed previously with respect to step 210.

In one embodiment, an analytics engine is integrated into test history program 116. In the embodiment, relevancy can be changed from a binary interpretation to a quantitative assessment by applying analytics to test history table 118. For example, test history program 116 can attribute more diagnostic value to test cases that appear more often in test history table 118 than test cases that appear only rarely. In another example, test history program 116 can deem areas where a code change prompted fixes in a different component as more sensitive than code changes that had fixes on the same lines. In a further example, test history program 116 can apply qualitative analysis to line-matching and object-matching algorithms such that test history program 116 can attribute historic code changes with a higher degree of overlap of a current code change with more relevancy. In yet another example, test history program 116 can mine corresponding metadata to assess the diagnostic importance of historic code changes, where the metadata may include, but is not limited to, the age of the entry in test history table 118, the severity of defects opened by a failure, and the number of attributed failing test cases. In addition, as test history table 118 grows over time, test history program 116 can use analytics to narrow the growing list of query results. For example, test history program 116 can mine metadata in test history table 118, such as size and scope of a new code change, the identification of the submitting coder, the level of experience of a submitting coder, the time of day the change was submitted, etc., to widen or narrow the relevancy threshold for test selection. Additionally, in an embodiment where an analytics engine is integrated into test history program 116, test history program 116 can determine an impact of code changes on the code behavior. If test history program 116 determines the impact of code changes exceeds a pre-defined threshold, then test history program 116 can notify a user of incoming, high-impact changes.

Figure 3:
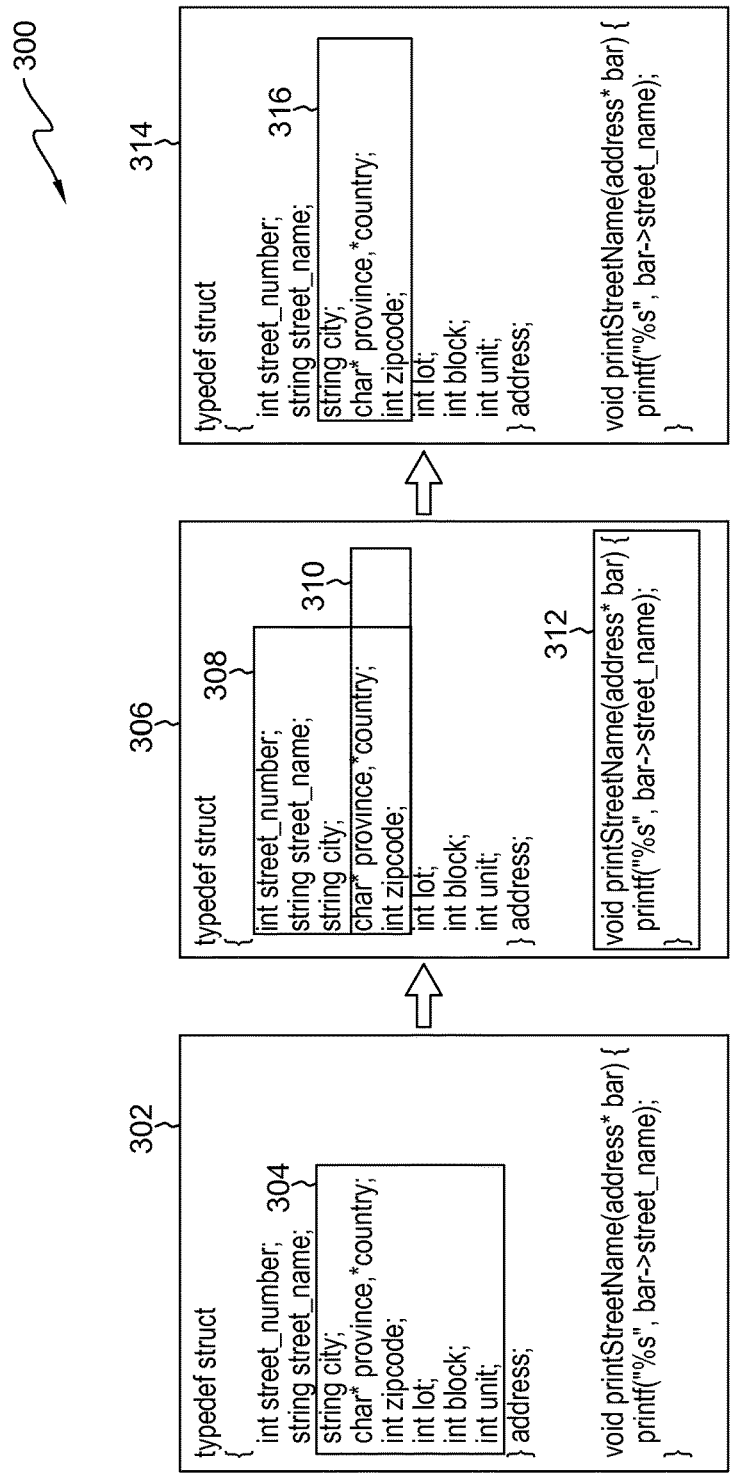
FIG. 3 illustrates an example of the operation of the test history program, on the server computer within the distributed data processing environment of FIG. 1, for determining relevant test cases for proactive testing, in accordance with an embodiment of the present invention.

FIG. 3 illustrates example 300 of the operation of test history program 116, on server computer 108 within distributed data processing environment 100 of FIG. 1, for determining relevant test cases in accordance with an embodiment of the present invention.

Box 302 depicts several lines of code from a target code, such as target code 110 as depicted with respect to FIG. 1. In the example, relevance is based on line level positional overlaps in the code. Code change 304 includes a section of the code that User 1 has just changed. As discussed with respect to step 202 of FIG. 2, test history program 116 receives code change 304. As discussed with respect to step 204 of FIG. 2, test history program 116 retrieves relevant code changes from version control database 114. Box 306 depicts three historic code changes made to the target code, i.e., code change 308, code change 310, and code change 312. Code change 308 and code change 310 overlap with the code change made by User 1. Code change 312 does not overlap with the code change made by User 1. Therefore, test history program 116 determines that code change 308 and code change 310 are relevant to code change 304, and code change 312 is not relevant to code change 304. Box 314 includes overlapping code change 316 which indicates the relevant code changes. As discussed with respect to decision block 206 of FIG. 2, test history program 116 queries test history table 118 to determine whether any failed test cases are associated with code change 308 and/or code change 310. Test history program 116 retrieves any relevant failed test cases and notifies the user.

Figure 4:
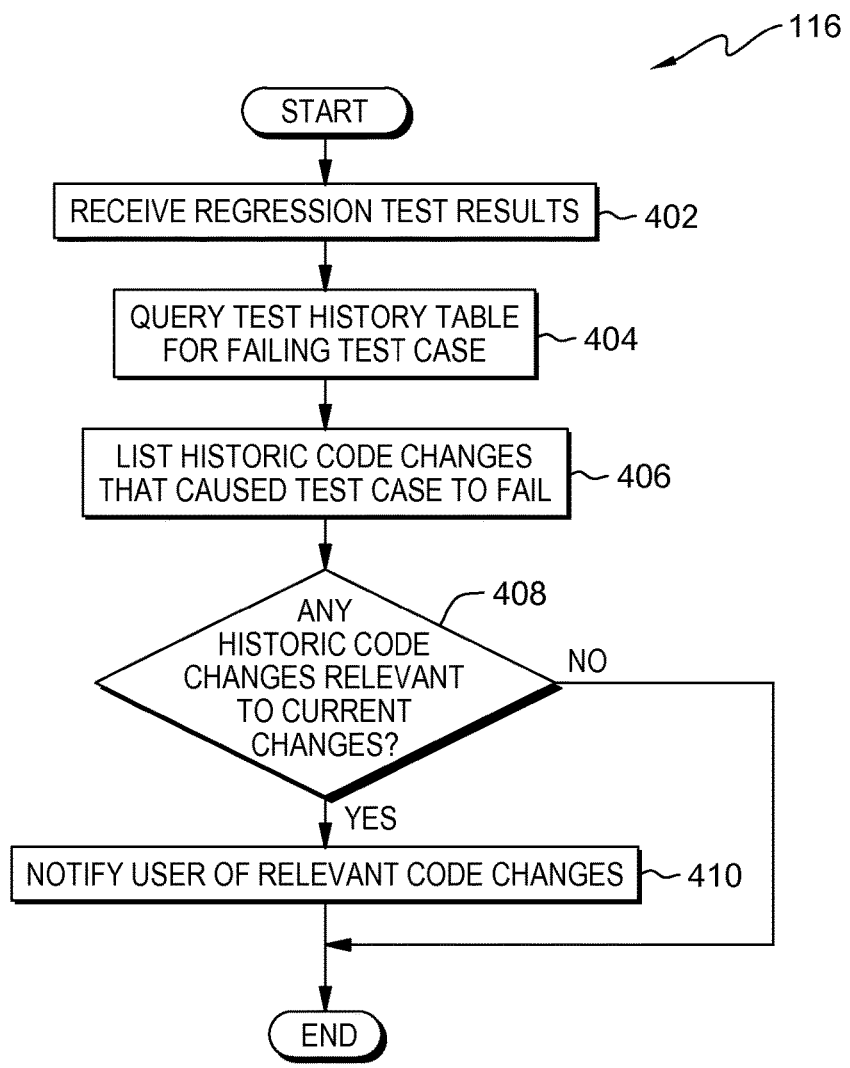
FIG. 4 is a flowchart depicting operational steps of a test history program, on a server computer within the distributed data processing environment of FIG. 1, for selecting relevant code changes for selective regression testing, in accordance with an embodiment of the present invention.

FIG. 4 is a flowchart depicting operational steps of test history program 116, on server computer 108 within distributed data processing environment 100 of FIG. 1, for selecting relevant code changes for selective regression testing, in accordance with an embodiment of the present invention.

Test history program 116 receives regression test results (step 402). During a regression test of target code 110, a particular test case fails (or begins to fail) and test history program 116 receives the test results which include the name of the failing test case. In one embodiment, test history program 116 may receive the results when the user invokes test history program 116 via user interface 106. In another embodiment, test history program 116 may receive the results automatically from the software tester upon the failure of a test case.

Test history program 116 queries test history table 118 for a failing test case (step 404). Test history program 116 queries test history table 118 for all associated code changes that have caused the failing test case to fail in the past. For example, if the failing test case is called rarely_fails.test, then test history program 116 queries test history table 118 for historic instances of rarely_fails.test failing and the historic code changes that were attributed to the test case failures.

Test history program 116 lists historic code changes that caused the test case to fail (step 406). Test history program 116 creates a list of historic code changes associated with failures of the particular test case with data retrieved from test history table 118.

Test history program 116 determines whether any historic code changes are relevant to a current code change (decision block 408). Test history program 116 compares code changes included in the list of historic code changes to current code changes to determine whether any of the historic code changes are relevant to the current code changes. There may be a plurality of current code changes if, for example, the regression testing of target code 110 is a weekly build that includes all code changes made over the past seven days. The relevance of historic code changes to current code changes may be determined on a plurality of levels of granularity, similar to those discussed with respect to FIG. 2. For example, relevance may be determined at the file level, the line level, or the object level.

If test history program 116 determines one or more historic code changes are relevant to a current code change ("yes" branch, decision block 408), then test history program 116 notifies the user of relevant code changes (step 410). Test history program 116 notifies the user of the list of relevant, historic code changes to enable the user to initiate selective regression testing of the current code changes that are more likely to be the root cause of the fail instead of testing all current changes sequentially, in the order in which the changes were made. By testing the relevant code changes first, the full test run time may be reduced. Test history program 116 provides the user with the list of one or more relevant, historic code changes. In one embodiment, test history program 116 may notify the user with an auto-generated message on a pop up screen, via user interface 106. In another embodiment, test history program 116 may notify the user via email. In yet another embodiment, test history program 116 may provide the list to the user by storing the list in test history table 118.

In one embodiment, responsive to retrieving relevant code changes, test history program 116 automatically initiates testing, on a build machine, of the current code changes associated with historic code changes that caused the particular test case to fail.

If test history program 116 determines no historic code changes are relevant to a current code change ("no" branch, decision block 408), then test history program 116 ends.

FIGS. 5A and 5B illustrate example 500 of the operation of test history program 116 selecting relevant code changes on server computer 108 within distributed data processing environment 100 of FIG. 1, in accordance with an embodiment of the present invention.

FIG. 5A includes table 502 which lists all code changes made in a weekly build to a particular target code, such as target code 110. Table 502 lists each code change with the name of the user that made the change as well as an identifier of the change and a list of which lines were changed in which program. As a user tests the weekly build, a test case named rarely_fails.test begins to fail. As discussed with respect to step 402 in FIG. 4, test history program 116 receives the regression test results. As discussed with respect to step 404 in FIG. 4, test history program 116 queries test history table 118 for test case rarely_fails.test. FIG. 5A also includes table 504 which lists all historic code changes that caused rarely_fails.test to fail in the past, as stored in test history table 118, as discussed with respect to step 406 of FIG. 4.

FIG. 5B also includes tables 502 and 504. In FIG. 5B, test history program 116 has determined six historic code changes that caused rarely_fails.test to fail are relevant to four of the code changes included in the current weekly build due to overlapping lines. Code change 506a in the weekly build is relevant to code change 506b in test history table 118. Code change 508a in the weekly build is relevant to code change 508b in test history table 118. Code change 510a in the weekly build is relevant to code changes 510b, 510c, and 510d in test history table 118. Code change 512a in the weekly build is relevant to code change 512b in test history table 118. The user can now selectively test code changes 506a, 508a, 510a, and 512a, as one or more of these changes is more likely to be the root cause of the failure of test case rarely_fails.test. Testing the subset of code changes may reduce the total time needed for determining the cause of the fail than if all changes listed in table 502 were tested sequentially.

Figure 6:
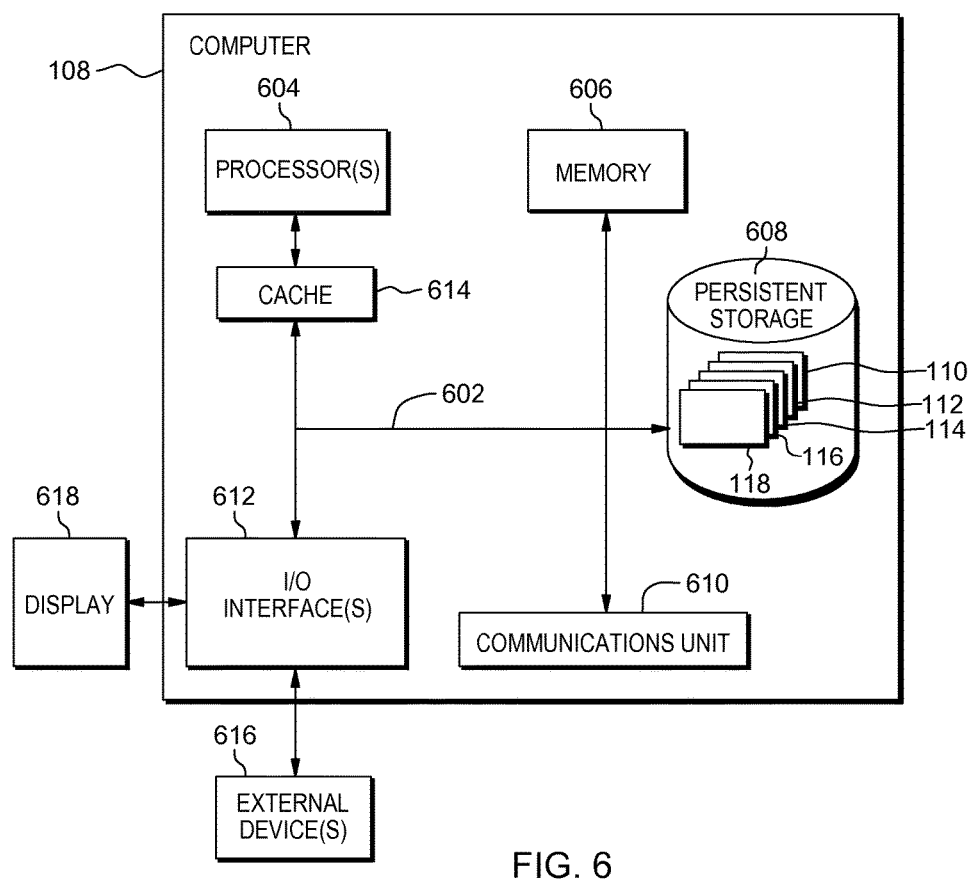
FIG. 6 depicts a block diagram of components of the server computer executing the test history program within the distributed data processing environment of FIG. 1, in accordance with an embodiment of the present invention.

FIG. 6 depicts a block diagram of components of server computer 108 within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Server computer 108 can include processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data, and data near recently accessed data, from memory 606.

Program instructions and data used to practice embodiments of the present invention, e.g., target code 110, version control software 112, version control database 114, test history program 116, and test history table 118, are stored in persistent storage 608 for execution and/or access by one or more of the respective processor(s) 604 of server computer 108 via memory 606. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of client computing device 104. In these examples, communications unit 610 includes one or more network interface cards. Communications unit 610 may provide communications through the use of either or both physical and wireless communications links. Target code 110, version control software 112, version control database 114, test history program 116, and test history table 118 may be downloaded to persistent storage 608 of server computer 108 through communications unit 610.

I/O interface(s) 612 allows for input and output of data with other devices that may be connected to server computer 108. For example, I/O interface(s) 612 may provide a connection to external device(s) 616 such as a keyboard, a keypad, a touch screen, a microphone, a digital camera, and/or some other suitable input device. External device(s) 616 can also include portable computer readable storage media such as, for example, thumb drives, portable optical or magnetic disks, and memory cards. Software and data used to practice embodiments of the present invention, e.g., target code 110, version control software 112, version control database 114, test history program 116, and test history table 118 on server computer 108, can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor. Display 618 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for reducing regression test duration, the computer program product comprising:
one or more computer readable storage device and program instructions stored on the one or more computer readable storage device, the stored program instructions comprising:
program instructions to receive a first code change, wherein the first code change is a new code change to source code;
program instructions to determine that one or more historic code changes are relevant to the first code change based, at least in part, on a positional overlap at a line level;

program instructions to retrieve the one or more relevant historic code changes;
program instructions to determine whether the one or more relevant historic code changes caused one or more test cases to fail in the past, wherein the one or more test cases that failed in the past and the one or more relevant historic code changes are stored in a table of test history;
responsive to determining that the one or more relevant historic code changes caused the one or more test cases to fail in the past, program instructions to retrieve the one or more test cases that failed in the past from the table of test history;
program instructions to test the first code change with the retrieved one or more test cases that failed in the past;
program instructions to receive regression test results, wherein the regression test results include at least one failing test case;
program instructions to query the table of test history for the at least one failing test case; and
program instructions to determine whether at least one historic code change corresponding to the at least one failing test case is relevant to at least one current code change.

2. The computer program product of claim 1, wherein the table of test history links one or more test cases that failed in the past to one or more historic code changes.

3. The computer program product of claim 2, wherein the table of test history links corresponding metadata to the one or more test cases that failed in the past and the one or more relevant historic code changes, wherein the corresponding metadata includes at least one of: a date of occurrence, an associated defect, a severity of a failure, an identification of a coder that made a change, an age of an entry, a number of failing test cases attributed to a code change, a size of a code change, a scope of a code change, a level of experience of a submitting coder, and a time of day a change was submitted.

4. The computer program product of claim 1, wherein the determined positional overlap is at one of a file level, an object level, or a component level.

5. The computer program product of claim 1, wherein the program instructions to determine that at least one historic code change corresponding to the at least one failing test case is relevant to at least one current code change comprise program instructions to determine positional overlap of the at least one current code change to the at least one historic code change, wherein relevance is based on the determined positional overlap and is at one of a file level, a line level, an object level, or a component level.

6. The computer program product of claim 1, wherein the table of test history explicitly links the one or more test cases that failed in the past to the one or more relevant historic code changes as rows in the table.

7. The computer program product of claim 1, the stored program instructions further comprising, program instructions to rank the one or more test cases that failed in the past based, at least in part, on a level of relevance of the one or more relevant historic code changes.

8. A computer system for reducing regression test duration, the computer system comprising:
one or more computer processors;
one or more computer readable storage device;
program instructions stored on the one or more computer readable storage device for execution by at least one of the one or more computer processors, the stored program instructions comprising:

program instructions to receive a first code change, wherein the first code change is a new code change to source code;
program instructions to determine that one or more historic code changes are relevant to the first code change based, at least in part, on a positional overlap at a line level;
program instructions to retrieve the one or more relevant historic code changes;
program instructions to determine whether the one or more relevant historic code changes caused one or more test cases to fail in the past, wherein the one or more test cases that failed in the past and the one or more relevant historic code changes are stored in a table of test history;
responsive to determining that the one or more relevant historic code changes caused one or more test cases to fail in the past, program instructions to retrieve the one or more test cases that failed in the past from the table of test history;
program instructions to test the first code change with the retrieved one or more test cases that failed in the past;
program instructions to receive regression test results, wherein the regression test results include at least one failing test case;
program instructions to query the table of test history for the at least one failing test case; and
program instructions to determine whether at least one historic code change corresponding to the at least one failing test case is relevant to at least one current code change.

9. The computer system of claim 8, wherein the table of test history links one or more test cases that failed in the past to one or more historic code changes.

10. The computer system of claim 9, wherein the table of test history links corresponding metadata to the one or more test cases that failed in the past and the one or more relevant historic code changes, wherein the corresponding metadata includes at least one of: a date of occurrence, an associated defect, a severity of a failure, an identification of a coder that made a change, an age of an entry, a number of failing test cases attributed to a code change, a size of a code change, a scope of a code change, a level of experience of a submitting coder, and a time of day a change was submitted.

11. The computer system of claim 8, wherein the determined positional overlap is at one of a file level, an object level, or a component level.

12. The computer system of claim 8, wherein the program instructions to determine that at least one historic code change corresponding to the at least one failing test case is relevant to at least one current code change comprise program instructions to determine positional overlap of the at least one current code change to the at least one historic code change, wherein relevance is based on the determined positional overlap and is at one of a file level, a line level, an object level, or a component level.

13. The computer system of claim 8, wherein the table of test history explicitly links the one or more test cases that failed in the past to the one or more relevant historic code changes as rows in the table.

14. The computer system of claim 8, the stored program instructions further comprising, program instructions to rank the one or more test cases that failed in the past based, at least in part, on a level of relevance of the one or more relevant historic code changes.

* * * * *